United States Patent
Yamataki

(10) Patent No.: US 8,550,496 B2
(45) Date of Patent: Oct. 8, 2013

(54) AIRBELT AND AIRBELT APPARATUS

(75) Inventor: Norio Yamataki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/394,870

(22) PCT Filed: Jul. 2, 2010

(86) PCT No.: PCT/JP2010/061331
§ 371 (c)(1),
(2), (4) Date: Mar. 8, 2012

(87) PCT Pub. No.: WO2011/033842
PCT Pub. Date: Mar. 24, 2011

(65) Prior Publication Data
US 2012/0169034 A1 Jul. 5, 2012

(30) Foreign Application Priority Data
Sep. 18, 2009 (JP) ................. 2009-217282

(51) Int. Cl.
*B60R 21/18* (2006.01)
*B60R 21/201* (2011.01)

(52) U.S. Cl.
USPC ....................................... 280/733

(58) Field of Classification Search
USPC ....................................... 280/733
See application file for complete search history.

(56) References Cited

U.S. PATENT DOCUMENTS

| 6,082,763 | A | 7/2000 | Kokeguchi |
| 7,568,726 | B2 * | 8/2009 | Kokeguchi et al. ............ 280/733 |
| 7,584,991 | B2 * | 9/2009 | Itoga et al. ..................... 280/733 |
| 7,604,253 | B2 * | 10/2009 | Nezaki et al. ................. 280/733 |
| 2002/0125700 | A1 * | 9/2002 | Adkisson ....................... 280/733 |
| 2005/0098991 | A1 | 5/2005 | Nagai et al. |
| 2006/0220361 | A1 | 10/2006 | Kokeguchi et al. |

(Continued)

FOREIGN PATENT DOCUMENTS

| JP | H07-052736 A | 2/1995 |
| JP | H07-125589 A | 5/1995 |

(Continued)

OTHER PUBLICATIONS

International Search Report from the International Bureau of WIPO for International Application No. PCT/JP2010/061331 dated Aug. 31, 2010 (2 pages) and an English translation of the same (2 pages).

(Continued)

*Primary Examiner* — Joseph Rocca
*Assistant Examiner* — Darlene P Condra
(74) *Attorney, Agent, or Firm* — Fitch, Even, Tabin & Flannery, LLP

(57) ABSTRACT

An airbelt wherein a folded body of a bag-like belt is covered with a cover, and the two are sewn together with tear seams, and wherein the tear seams can be torn without the need to use a high-power inflator when the airbelt is inflated, and an airbelt apparatus employing this airbelt are provided. In one form, a mesh webbing and a mesh cover cover the bag-like belt. A plurality of parts of the airbelt in the longitudinal direction are sewn with the tear seams. The tear seams extend in the width direction of the airbelt and curve so as to be convex toward a tongue.

8 Claims, 8 Drawing Sheets

(56) References Cited

U.S. PATENT DOCUMENTS

| | | | |
|---|---|---|---|
| 2007/0063493 A1* | 3/2007 | Higuchi et al. | 280/733 |
| 2007/0080528 A1 | 4/2007 | Itoga et al. | |
| 2009/0001693 A1* | 1/2009 | Tavares Da Silva Vinhas | 280/728.3 |
| 2009/0243264 A1* | 10/2009 | Kaulbersch | 280/728.3 |

FOREIGN PATENT DOCUMENTS

| | | |
|---|---|---|
| JP | H11-165603 A | 6/1999 |
| JP | H11-255057 A | 9/1999 |
| JP | H11-342827 A | 12/1999 |
| JP | 2000-203380 A | 7/2000 |
| JP | 2004-352088 A | 12/2004 |
| JP | 2005-193881 A | 7/2005 |
| JP | 2007-126123 A | 5/2007 |

OTHER PUBLICATIONS

Extended European Search Report issued in counterpart European Application No. 10 81 6955.8 dated Jun. 11, 2013 (6 pages).

* cited by examiner

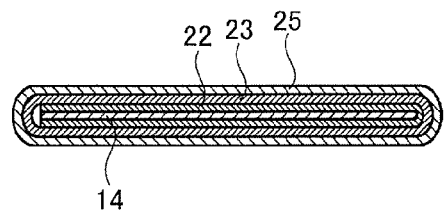
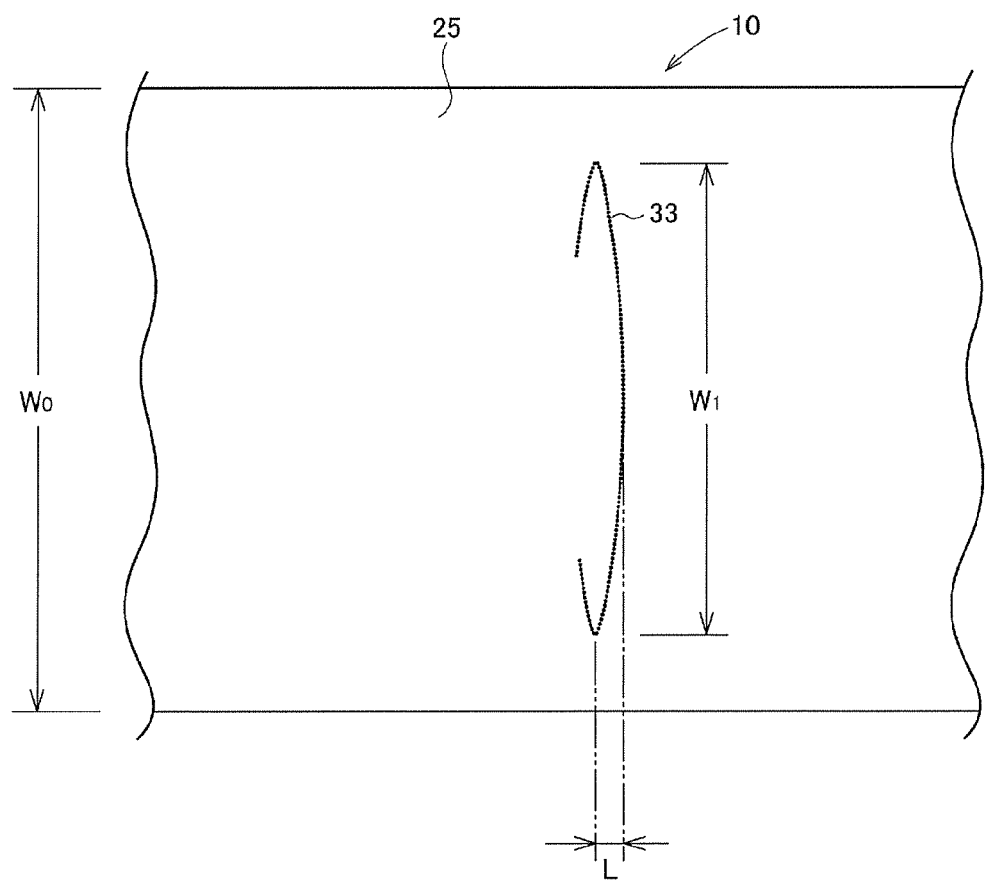

AIRBELT AND AIRBELT APPARATUS

CROSS-REFERENCE TO RELATED APPLICATIONS

This application is a U.S. national phase application filed under 35 U.S.C. §371 of International Application PCT/JP2010/061331, filed on Jul. 2, 2010, designating the United States, which claims priority from Japanese Application 2009-217282, filed Sep. 18, 2009, which are hereby incorporated herein by reference in their entirety.

FIELD OF THE INVENTION

The present invention relates to an airbelt configured to inflate a bag-like belt with gas from an inflator in order to restrain a vehicle occupant at the time of a vehicle collision or the like, and an airbelt apparatus employing the same. More specifically, the present invention relates to an airbelt and an airbelt apparatus in which a folded body of a bag-like belt is surrounded with a cover, and the folded body and the cover are sewn together with tear seams.

BACKGROUND OF THE INVENTION

Examples of this type of conventional airbelt apparatuses are described in FIG. 6 of Japanese Unexamined Patent Application Publication No. 11-255057, and FIG. 8 of Japanese Unexamined Patent Application Publication No. 2000-203380.

These are airbelts including a folded body formed by folding a bag-like belt into a belt-like shape, the bag-like belt being to be inflated by introduction of gas, and a cover covering the folded body of the bag-like belt, wherein the folded body and the cover are sewn together with tear seams, and thereby the slip between the two is prevented.

In such airbelts, the folded body and the cover are sewn together, and the cover does not slip relative to the folded body. The tear seams have such a strength that they tear when the airbelts are inflated.

CITATION LIST

Japanese Unexamined Patent Application Publication No. 11-255057 does not specifically describe the arrangement of the tear seams.

In Japanese Unexamined Patent Application Publication No. 2000-203380, the tear seams are provided in the longitudinal direction of the airbelt contiguously in a zigzag manner. In the case where tear seams are contiguously provided as described above, sometimes a high-power inflator (an inflator that generates high-pressure gas) is required in order to increase the pressure of gas from the inflator and to thereby tear the tear seams when the airbelt is inflated.

SUMMARY OF THE INVENTION

An object of the present invention is to provide an airbelt wherein a folded body of a bag-like belt is covered with a cover, and the two are sewn together with tear seams, and wherein the tear seams can be torn without the need to use a high-power inflator when the airbelt is inflated, and an airbelt apparatus employing this airbelt.

An airbelt according to a first aspect includes a folded body formed by folding a bag-like belt into a belt-like shape, the bag-like belt being to be inflated by introducing gas from one end thereof in the longitudinal direction, and a cover covering the folded body of the bag-like belt, wherein the folded body and the cover are sewn together with a plurality of tear seams, and wherein the plurality of tear seams extend in the width direction of the airbelt and are spaced in the longitudinal direction of the airbelt.

An airbelt according to a second aspect is the airbelt according to the first aspect, wherein part of each tear seam extending in the width direction is located closer to the one end of the airbelt than the other parts of each tear seam.

An airbelt according to a third aspect is the airbelt according to the second aspect, wherein each tear seam extends while curving or bending such that the middle part thereof in the width direction of the airbelt is located on the side of the one end of the airbelt.

An airbelt according to a fourth aspect is the airbelt according to the third aspect, wherein the distance L between the middle part and the terminal part of each tear seam in the longitudinal direction of the airbelt is from 1 mm to 20 mm.

An airbelt according to a fifth aspect is the airbelt according to the second aspect, wherein each tear seam extends obliquely to the width direction of the airbelt.

An airbelt according to a sixth aspect is the airbelt according to the second aspect, wherein each tear seam extends in a zigzag manner such that a plurality of parts thereof in the width direction of the airbelt are located closer to the one end than the other parts.

An airbelt according to a seventh aspect is the airbelt according to any one of the first to sixth aspects, wherein the width $W_1$ of the tear seams is from 20% to 100% of the width $W_0$ of the airbelt.

An airbelt apparatus according to an eighth aspect includes an inflatable airbelt, and an inflator that supplies gas into the airbelt and thereby inflates the airbelt, wherein the airbelt is that according to any one of the first to seventh aspects.

ADVANTAGEOUS EFFECTS OF INVENTION

In the airbelt of the present invention, a folded body of a bag-like belt and a cover covering this are sewn together with tear seams, and therefore the displacement of the cover relative to the folded body of the bag-like belt is prevented. In the present invention, the tear seams are spaced in the longitudinal direction of the airbelt, and therefore the tear seams can be torn without the need to use a high-power inflator when the airbelt is inflated.

When part of each tear seam is located closer to one end of the airbelt (more upstream in the gas flow direction) than the other parts, the stress concentrates to the part of each tear seam, and the tear of each tear seam starts in this part. Once the tear starts, the tear spreads throughout each tear seam, and the whole of each tear seam tears in a short time.

When the airbelt extends so as to curve such that the middle part of each tear seam in the width direction of the airbelt is located on the side of the one end, the shear stress produced in each tear seam when the cover and the folded body of the bag-like belt try to be displaced from each other is distributed throughout each tear seam, and the concentration of shear stress in part of each tear seam is prevented.

When the distance L between the middle part and the terminal part of each tear seam is 1 mm or more, more specifically 4 mm or more, such an advantageous effect can be sufficiently obtained.

The percentage $(W_1/W_0) \times 100\%$ of the width $W_1$ of the tear seams to the width $W_0$ of the airbelt is preferably from about 20% to about 100%, more preferably from about 30% to about 50%.

BRIEF DESCRIPTION OF THE DRAWINGS

FIG. 6 is a sectional view taken along line VI-VI of FIG. 5b.

FIG. 7 is a front view of part of the airbelt according to the embodiment.

DETAILED DESCRIPTION OF THE PREFERRED EMBODIMENTS

A first embodiment of the present invention will now be described with reference to FIG. 1 to FIG. 8.

Figure 1:
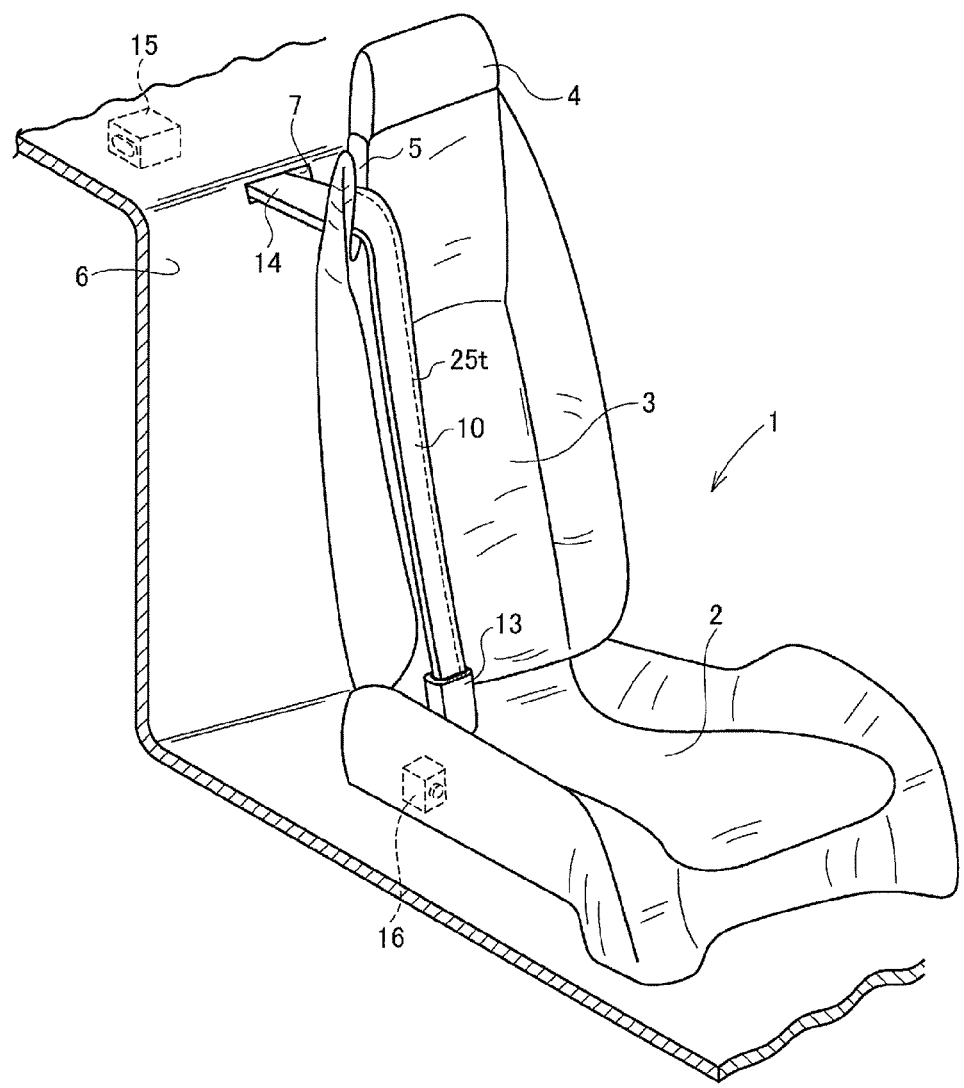
FIG. 1 is a perspective view of the inside of an automobile having an airbelt apparatus according to an embodiment.
Figure 2:
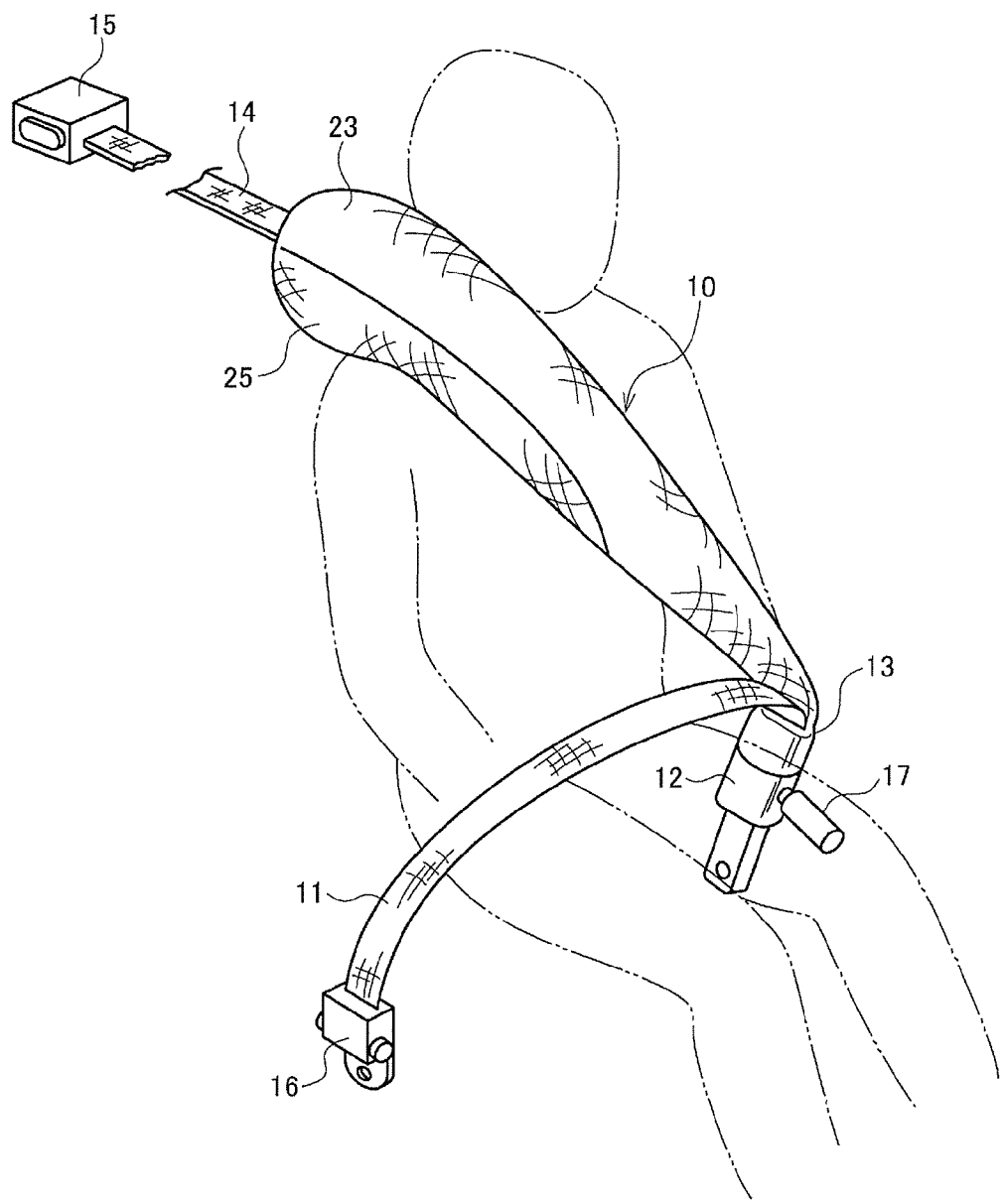
FIG. 2 is a perspective view of the airbelt apparatus according to the embodiment with the airbelt inflated.
Figure 8:
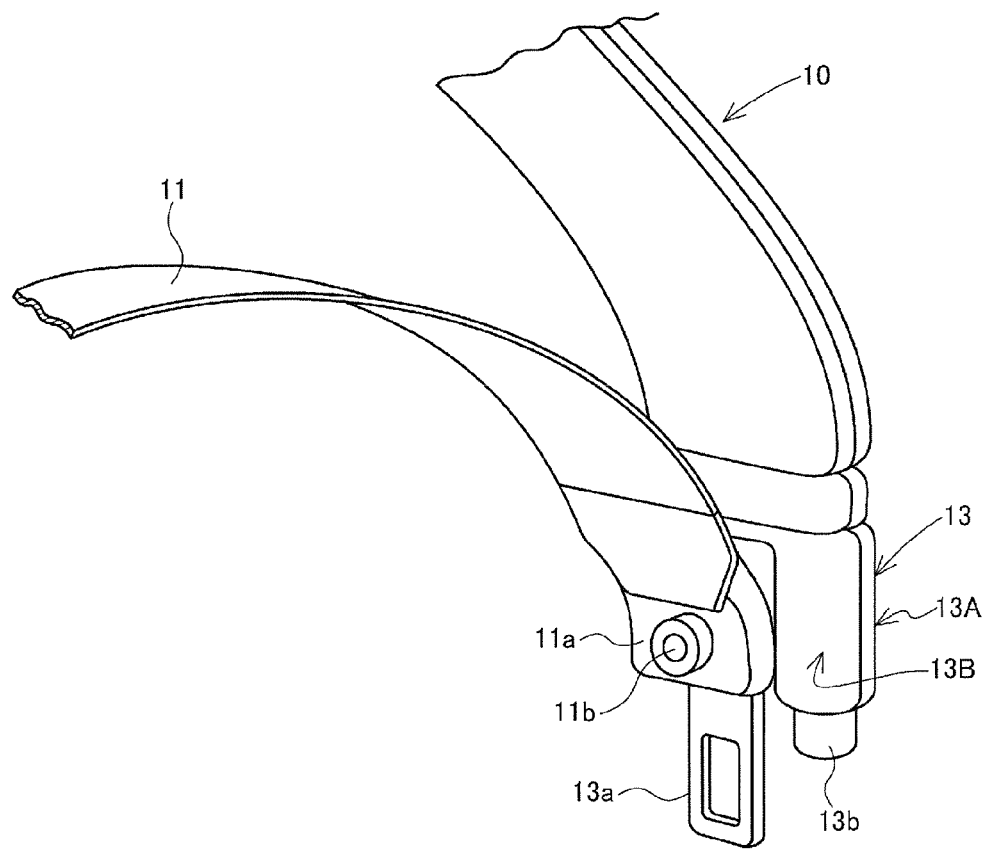
FIG. 8 is a perspective view of a tongue part of the airbelt.

First, with reference to FIG. 1 and FIG. 2, the overall configuration of a seat having an airbelt apparatus will be described schematically. FIG. 1 is a perspective view showing the right-side seat and its vicinity of a two-seat (two-seater) automobile equipped with an airbelt apparatus, FIG. 2 is a perspective view of the airbelt apparatus with the airbelt inflated, and FIG. 8 is a perspective view of a tongue of this airbelt.

This seat 1 has a seat cushion 2, a seat back 3, and a headrest 4. This headrest 4 is provided with a slit 5 for passing an airbelt 10. The slit 5 has such a shape that it extends downward from the upper end of the right side of the seat back 3. When an occupant is not sitting in the seat 1, the airbelt 10 hangs from this slit 5 along the right side of the front of the seat back 3.

In this embodiment, a retractor 15 for retracting a webbing 14 connected to the airbelt 10 is disposed behind the seat 1. The webbing 14 reaches the retractor 15 through an opening 7 provided in the vehicle body interior panel 6. The retractor 15 is fixed to the vehicle body member.

In this embodiment, a retractor 16 for retracting a lap belt 11 is disposed under the seat cushion 2, and is fixed to the seat frame. The lap belt 11 is passed through an opening (not shown) provided in the seat cushion 2.

The retractors 15 and 16 are both emergency lock retractors (ELRs).

Since the airbelt 10 hangs along the front of the seat back 3, when the occupant opens the door and sits in the seat 1 or leaves the seat 1, the back of the occupant slides on the airbelt 10, and a folded body of a bag-like belt and a cover in the airbelt 10 try to be displaced from each other. In this embodiment, the folded body of the bag-like belt and the cover 2 of the airbelt 10 are sewn together with tear seams, and thereby this displacement is prevented.

As shown in FIG. 2, the airbelt apparatus has an airbelt 10 forming a shoulder belt portion that goes over one of the shoulders (the right shoulder in this case) of an occupant sitting in the seat 1 and goes over the front of the upper half of the body of the occupant diagonally (from top right to bottom left in this embodiment), a webbing 14 connected to the upper end of the airbelt 10, a lap belt portion 11 that goes over the waist of the occupant in the horizontal direction, a buckle device 12 installed adjacent to one side (the left side in this embodiment) of the seat, a tongue 13 that is inserted into and engaged with the buckle device 12 when the belt is used, a retractor 15 that retracts the webbing 14, and a retractor 16 that retracts the lap belt portion 11.

The buckle device 12 is provided with an inflator 17, and gas jetted from the inflator 17 is introduced into the airbelt 10.

As shown in FIG. 8, the tongue 13 is provided with a tongue plate 13a that is inserted into the buckle device 12, and a nozzle 13b for receiving gas from the inflator 17 and guiding the gas into the airbelt 10.

To the distal end of the lap belt portion 11, an anchor plate 11a is attached. The anchor plate 11a is fixed to the tongue 13 with a bolt. Reference sign 11b denotes a decorative cap for concealing the head of this bolt.

With reference to FIG. 3 to FIG. 7, the configuration of the airbelt 10 will be described in detail.

Figure 3:
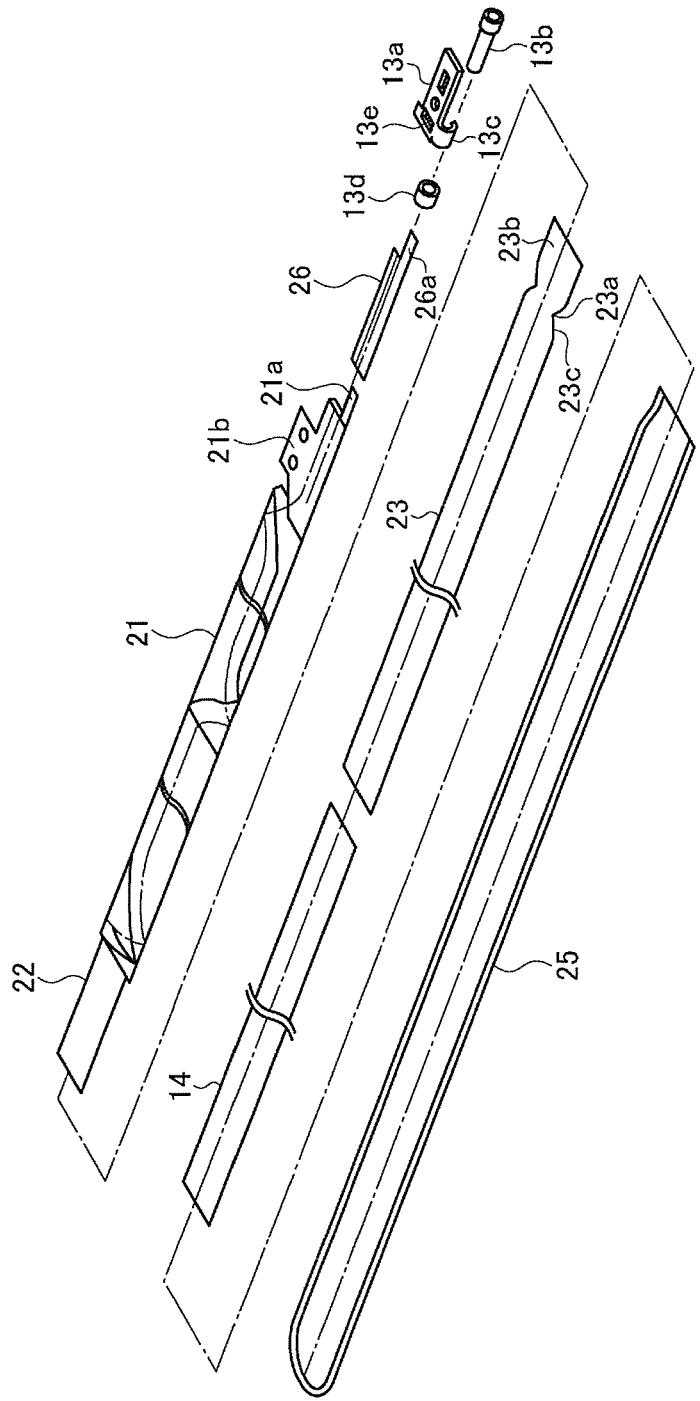
FIG. 3 is an exploded perspective view of an airbelt according to the embodiment.

As shown in FIG. 3, the airbelt 10 includes a bag-like belt 21, a strap 22 extending from the rear end of the bag-like belt 21, a mesh webbing 23 covering the bag-like belt 21, a mesh cover 25 covering the mesh webbing 23, and a heat-resistant cloth 26 disposed in the bag-like belt 21.

The bag-like belt 21 is inflated by gas from the inflator 17, and is folded into an elongate rectangular belt-like shape as shown in FIG. 3. In this embodiment, as shown in FIG. 2, the rear end of the bag-like belt 21 is significantly inflated on the right side of the occupant's head and restrains the head from the right.

The strap 22 is made of a belt-like cloth and is sewn to the rear end of the bag-like belt 21. The strap 22 may be formed integrally with the base cloth of the bag-like belt 21.

Figure 4A:
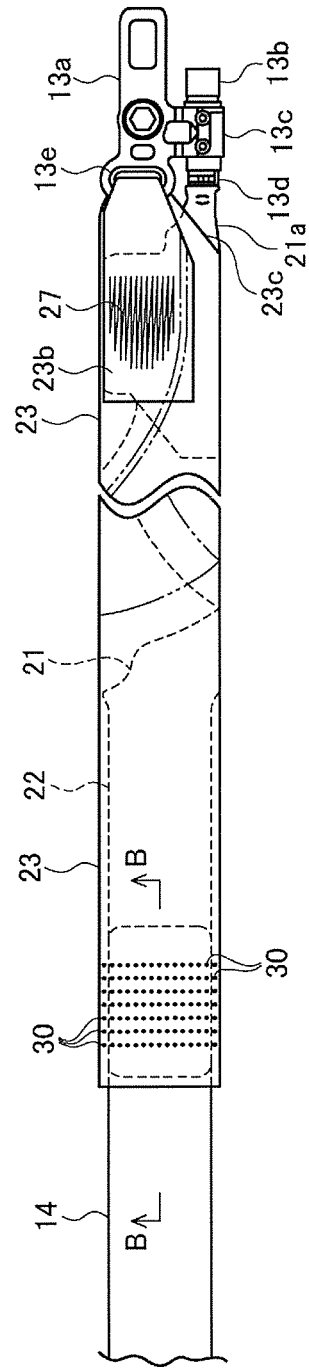
FIG. 4a is a front view of the airbelt apparatus according to the embodiment during manufacture.
Figure 4B:
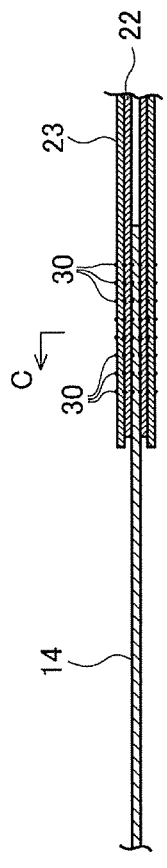
FIG. 4b is a sectional view taken along line B-B of FIG. 4a, and FIG. 4c is a sectional view taken along line C-C of FIG. 4b.

The mesh webbing 23 is an elongate tubular envelope-shaped member that opens at both ends. As shown in FIG. 4a and FIG. 4b, the strap 22, the distal end of the webbing 14, and the rear end of the mesh webbing 23 are stacked and sewn together using a sewing machine. Reference sign 30 denotes these seams. When the webbing 14 is sewn to the strap 22, the webbing 14 is not connected to the retractor 15.

Figure 4C:
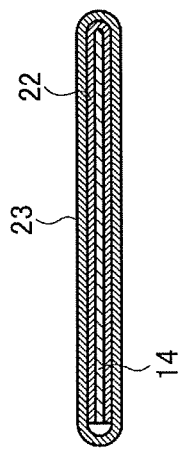

In this embodiment, as shown in FIG. 4c, the strap 22 is folded in two along its longitudinal fold line, and the webbing 14 is sandwiched between the two halves of the strap 22. However, the strap 22 may be a flat sheet that is not folded in two. The rear end of the mesh webbing 23 is almost coincident with the rear end of the bag-like belt 22.

The full length of the mesh webbing 23 is slightly longer than the folded bag-like belt 21, and the distal end of the mesh webbing 23 extends from the distal end of the bag-like belt 21. As shown in FIG. 3, a narrow neck portion 23a is provided near the distal end of the mesh webbing 23, and the part 23b on the distal end side of the neck portion 23a is slightly narrower than the main body part of the mesh webbing 23. In the vicinity of the neck portion 23, an oblique side 23c intersecting obliquely with the longitudinal side of the mesh webbing 23 is formed. The mesh webbing 23 opens at the oblique side 23c and thereby an opening is formed. As shown in FIG. 4a, the distal end 21a of the bag-like belt 21 extends through the opening at the oblique side 23c toward the outside of the mesh webbing 23 and is connected to the nozzle 13b of the tongue 13.

Into the distal end of the bag-like belt 21, the heat-resistant cloth 26 is inserted. The distal end 26a of the heat-resistant cloth 26 and the distal end 21a of the bag-like belt 21 are fitted onto the rear end of the nozzle 13b and are fixed to the nozzle 13b with a securing ring 13d. The nozzle 13b is fixed to a holder portion 13c integral with the tongue plate 13a by bolting or the like.

At the rear end of the tongue plate 13a, an elongate rectangular opening 13e is provided. As shown in FIG. 4a, the distal end portion 23b of the mesh webbing 23 is inserted into the opening 13e and is folded back in the neck portion 23a, and the distal end portion 23b is placed on the main body of the mesh webbing 23. Then, the protruding portion 21b of the bag-like belt 21 (FIG. 3), the main body portion of the mesh webbing 23, and the distal end portion 23b of the mesh webbing 23 are sewn together using a sewing machine. Reference sign 27 in FIG. 4a denotes this seam.

In this manner, the distal end of the mesh webbing 23 is connected to the tongue plate 13a. As described above, the rear end of the mesh webbing 23 is sewn to the webbing 14 with seams 30. The mesh webbing 23 is heat-stretched so as not to stretch in the longitudinal direction. For this reason, when a tensile force is applied to the airbelt 10, the tensile load between the webbing 14 and the tongue plate 13a is borne by the mesh webbing 23.

The mesh webbing 23 is made of woven fabric, and stretches flexibly in the diameter increasing direction when the bag-like belt 21 is inflated. However, as described above, the mesh webbing 23 is heat-stretched so as not to stretch in the longitudinal direction. For this reason, when the airbelt 10 is inflated, the increase in diameter of the mesh webbing 23 decreases the length of the mesh webbing 23. Thereby, pretension is applied to the airbelt 10 and the webbing 14.

Figure 5A:
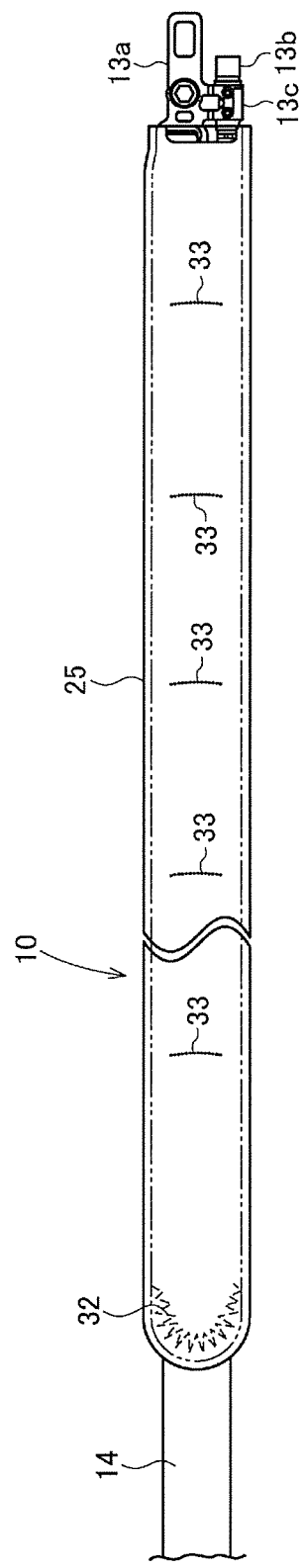
FIG. 5a is a front view of the airbelt apparatus according to the embodiment during manufacture.
Figure 5B:
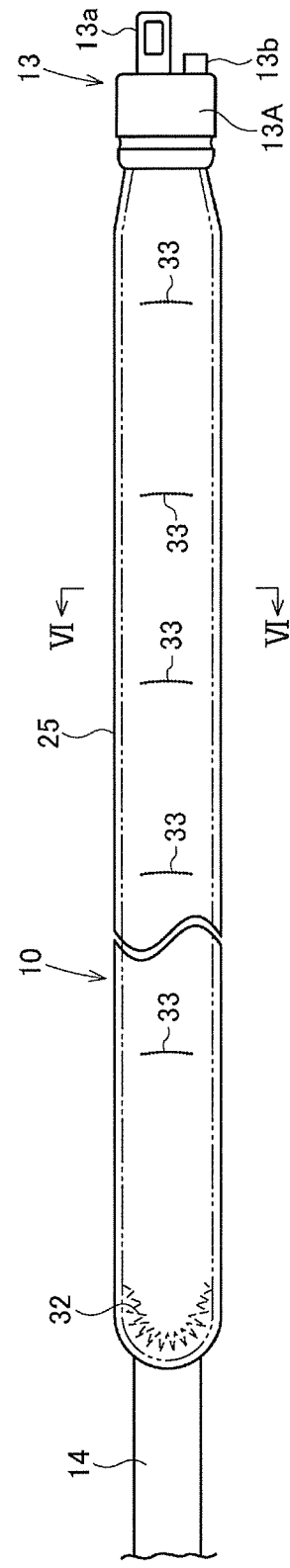
FIG. 5b is a front view of the airbelt that has been manufactured.

As shown in FIGS. 5 and 6, the mesh cover 25 is attached so as to cover the mesh webbing 23. The mesh cover 25 is a flat tubular envelope-shaped member that opens at both ends. The mesh cover 25 is sewn into a tubular shape, and the sewn portion of the mesh cover 25 in the longitudinal direction corresponding to the occupant side is a tear seam 25t (FIG. 1) that tears when the bag 10 is inflated.

The rear end of the mesh cover 25 is caused to protrude slightly from the rear ends of the mesh webbing 23 and the strap 22, and this protruding portion is sewn to the webbing 14 with a seam 32.

The thread forming the seams 30 and 32 is sufficiently strong, and does not break when the bag-like belt 21 is inflated.

A plurality of parts, in the longitudinal direction, of the integral belt-like airbelt 10 configured as above and including the bag-like belt 21, the mesh webbing 23, and the mesh cover 25 are sewn with tear seam 33. The tear seams 33, penetrating the airbelt 10 from one surface to the other surface, sew the bag-like belt 21, the mesh webbing 23, and the mesh cover 25 together.

As shown in FIG. 7, in this embodiment, each tear seam 33 extends in the width direction of the airbelt 10. Each tear seam 33 curves such that the middle thereof in the width direction of the airbelt 10 is convex toward the upstream side in the gas flow direction, that is to say, toward the tongue 13. Although both ends of each tear seam 33 are away from the side edges of the airbelt 10, they may reach the side edges. As shown in the figure, each tear seam 33 has backstitch portions for preventing raveling.

The distance L in the longitudinal direction of the airbelt between the middle part of each tear seam 33 and the terminal part of each tear seam 33 is preferably from about 1 mm to about 20 mm, more preferably from about 4 mm to about 20 mm. The length $W_1$ of each tear seam 33 in the width direction of the airbelt is preferably from about 20% to about 100%, more preferably from about 30% to about 50% of the width $W_0$ of the airbelt 10.

Within this range, the slip between the bag-like belt 21, the mesh webbing 23, and the mesh cover 25 can be sufficiently prevented.

The distance L in the longitudinal direction of the airbelt between the middle part and both ends of each tear seam 33 is preferably from about 2% to about 60%, more preferably from about 8% to about 60% of the width $W_1$ of each tear seam 33. Since each tear seam 33 is curved such that the middle part of each tear seam 33 is located on the tongue 13 side, the stress concentrates to the middle part of each tear seam 33 when the airbelt 10 is inflated, and the middle part of each tear seam 33 tears first. That is to say, since gas flows in from the tongue 13 side, the stress concentrates to the middle part of each tear seam 33 closest to the tongue 13. The middle part of the airbelt 10 in the width direction inflates most easily. Also because of this, the stress concentrates to the middle part of each tear seam 33. Once the middle part of each tear seam 33 tears, the tear of each tear seam 33 propagates rapidly to both sides, the whole of each tear seam 33 tears rapidly, and the airbelt 10 is inflated.

The distance between the tear seams 33 is preferably from about 50 mm to about 200 mm, more preferably from about 80 mm to about 120 mm. The number of the tear seams 33 is preferably from about 1 to about 18, more preferably from about 3 to about 10. The intervals between the tear seams 33 may be equal or unequal.

The above-described mesh cover 25 has such a length that the distal end thereof covers the rear end of the tongue plate 13a.

Case halves 13A and 13B for the tongue are attached so as to cover the rear part of the tongue plate 13a and the distal end of the mesh cover 25. The case halves 13A and 13B are made of synthetic resin. By positioning the case halves 13A and 13B face to face and one on top of the other, the rear part of the tongue plate 13a and the distal end of the mesh cover 25 are encapsulated. After that, the rear end of the webbing 14 is connected to the retracting shaft of the retractor 15.

In the airbelt and airbelt apparatus configured as above, the airbelt 10 is provided with tear seams 33, and the displacement of the bag-like belt 21, the mesh webbing 23, and the mesh cover 25 on the superimposed surfaces is prevented. When the airbelt 10 is inflated, each tear seam 33 tears rapidly. In this embodiment, each tear seam 33 curves gently, and there is no angular part. Therefore, when the superimposed surfaces try to be displaced, the stress applied to each tear seam 33 is distributed throughout each tear seam 33.

Figure 9:
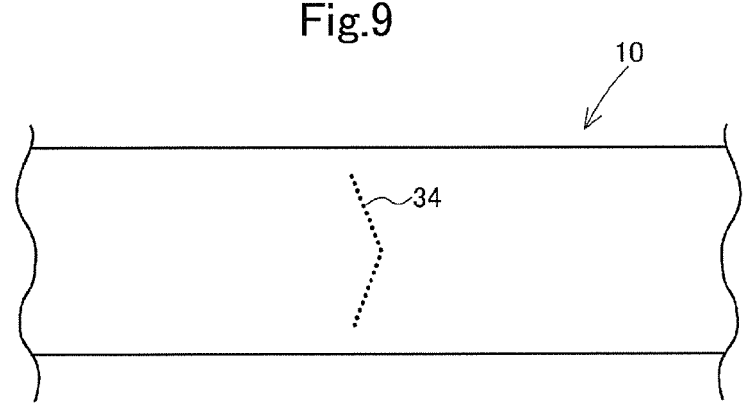
FIG. 9 is a front view of part of an airbelt according to another embodiment.
Figure 10:
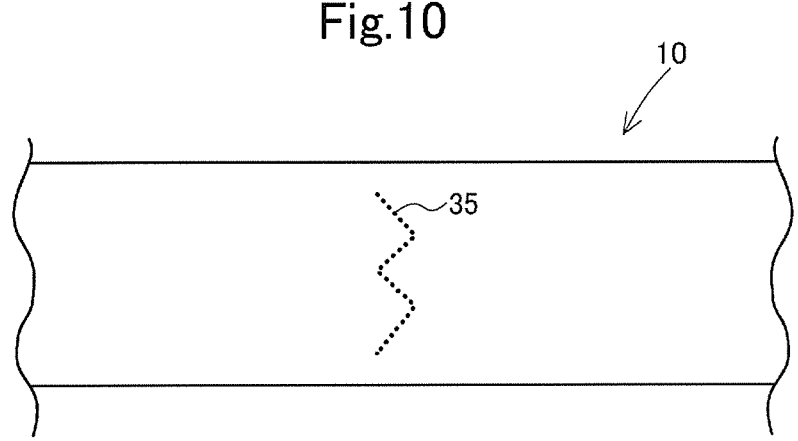
FIG. 10 is a front view of part of an airbelt according to still another embodiment.
Figure 11:
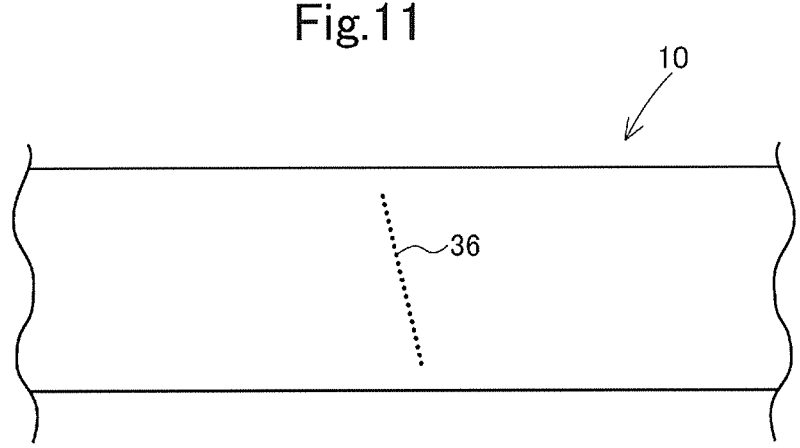
FIG. 11 is a front view of part of an airbelt according to a different embodiment.

In the above-described embodiment, each tear seam 33 curves gently. Alternatively, tear seams 34 bent in a dogleg-shape as shown in FIG. 9 may be provided. Like the W-shaped tear seam 35 shown in FIG. 10, a plurality of parts of each tear seam may be located on the tongue side. As shown in FIG. 11, linear tear seams 36 intersecting obliquely with the width direction of the airbelt 10 may be provided.

Although a particular aspect of the present invention has been described in detail, it will be obvious to those skilled in the art that various changes may be made without departing from the intent and scope of the present invention.

The invention claimed is:

1. An airbelt comprising: a folded body formed by folding a bag-like belt into a belt-like shape and having opposite end portions, the bag-like belt being inflated by introducing gas from one end portion thereof in the longitudinal direction; tubular webbing having opposite end portions, extending along and about the bag-like belt, and having connections to the bag-like belt at or adjacent to the corresponding end portions thereof with the webbing being configured to stretch radially but not longitudinally upon inflation of the bag-like belt; and a cover having opposite portions and covering the folded body of the bag-like belt and the tubular webbing extending thereabout, wherein the folded body, the tubular webbing, and the cover are sewn together with a plurality of tear seams, and wherein the plurality of tear seams each extend in a width direction of the airbelt and are spaced in a longitudinal direction of the airbelt to be disposed between and spaced from the respective end portions of the bag-like belt, the tubular webbing, and the cover.

2. The airbelt according to claim 1, wherein part of each tear seam extending in the width direction is located closer to the one end of the airbelt than the other parts of each tear seam.

3. The airbelt according to claim 2, wherein each tear seam extends while curving or bending such that the middle part thereof in the width direction of the airbelt is located on the side of the one end of the airbelt.

4. The airbelt according to claim 3, wherein the distance L between the middle part and the terminal part of each tear seam in the longitudinal direction of the airbelt is from 1 mm to 20 mm.

5. The airbelt according to claim 2, wherein each tear seam extends obliquely to the width direction of the airbelt.

6. The airbelt according to claim 2, wherein each tear seam extends in a zigzag manner such that a plurality of parts thereof in the width direction of the airbelt are located closer to the one end than the other parts.

7. The airbelt according to claim 1, wherein the width $W_1$ of the tear seams is from 20% to 100% of the width $W_0$ of the airbelt.

8. An airbelt apparatus comprising: an inflatable airbelt; and an inflator that supplies gas into the airbelt and thereby inflates the airbelt, wherein the airbelt is that according to claim 1.

* * * * *